(12) United States Patent
Inoue et al.

(10) Patent No.: US 7,511,789 B2
(45) Date of Patent: Mar. 31, 2009

(54) LIQUID CRYSTAL DISPLAY

(75) Inventors: Yuichi Inoue, Kameyama (JP);
Takahiro Sasaki, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 427 days.

(21) Appl. No.: 11/333,528

(22) Filed: Jan. 18, 2006

(65) Prior Publication Data
US 2006/0203166 A1    Sep. 14, 2006

(30) Foreign Application Priority Data
Jan. 19, 2005    (JP) .............................. 2005-011328

(51) Int. Cl.
*G02F 1/1337*    (2006.01)
(52) U.S. Cl. .................... 349/129; 349/143; 349/144
(58) Field of Classification Search .................. 349/129
See application file for complete search history.

(56) References Cited

U.S. PATENT DOCUMENTS

| | | | | |
|---|---|---|---|---|
| 6,836,308 B2 * | 12/2004 | Sawasaki et al. | ............ | 349/129 |
| 7,206,048 B2 * | 4/2007 | Song | ..................... | 349/129 |
| 7,262,824 B2 * | 8/2007 | Sasabayashi et al. | ........ | 349/129 |
| 2003/0043336 A1 | 3/2003 | Sasaki et al. | | |

FOREIGN PATENT DOCUMENTS

| | | | |
|---|---|---|---|
| JP | 2003-149647 A | 5/2003 | |
| JP | 2004-354507 A | 12/2004 | |
| JP | 2005-258194 A | 9/2005 | |

* cited by examiner

*Primary Examiner*—Richard H Kim
(74) *Attorney, Agent, or Firm*—Nixon & Vanderhye P.C.

(57) ABSTRACT

The present invention relates to a liquid crystal display, which is used for a display section of an electronic apparatus, and it is an object thereof is to provide a liquid crystal display having an excellent display characteristic. The liquid crystal display has a TFT substrate and an opposite substrate, which are provided opposite to the surface thereof and a liquid crystal layer, which is sealed between the both substrates. A pixel range, which is defined by a gate bus line and a drain bus line and is disposed on the TFT substrate, has a sub-pixel A to which a gradation voltage for driving the liquid crystal layer is applied, and a sub-pixel. B which is formed separated from the sub-pixel A and to which a voltage lower than the gradation voltage is applied. On the opposite substrate, linear protrusions are formed so as to regulate the direction of alignment of a liquid crystal molecular of the liquid crystal layer. An arrangement interval w1 (=w1$a$) of the linear protrusion within the sub-pixel A is formed so as to be shorter than an arrangement interval w2 (=(w2$a$+w2$b$)/2) of each of the linear protrusions within the sub-pixel B.

21 Claims, 7 Drawing Sheets

LIQUID CRYSTAL DISPLAY

BACKGROUND OF THE INVENTION

1. Field of the Invention

The present invention relates to a liquid crystal display, which is used for a display section of an electronic apparatus.

2. Description of the Related Art

A liquid crystal display has been used as a display section of a notebook computer, a TV receiver, a monitor for a personal computer, and a projector or the like. In recent years, a large-screen liquid crystal display panel has been manufactured and the demand of the liquid crystal display has been rapidly increased as the display section of the TV receiver. Therefore, the liquid crystal display is required for a higher visual quality. However, the liquid crystal display of a TN (Twisted Nematic) system, which was predominant display in the past, has a problem that it is difficult to obtain a display characteristic as the display section of the TV receiver because its viewing angle characteristics is not satisfactory. Therefore, in recent years, in order to obtain wide viewing angle characteristics, the technologies other than the TN system have been used for the liquid crystal display. One of these technologies is a technology referred to as a MVA (Multi-domain Vertical Alignment) system. In this MVA system, vertically aligning a liquid crystal molecular on a substrate when applying no voltage, if a voltage is applied to the liquid crystal, the alignment of the liquid crystal molecular is defined by a protrusion formed on the substrate or a slit provided on a transparent electrode (ITO).

Generally, in a vertical alignment system of vertically aligning the liquid molecular on the substrate, it has been known that an optical characteristic measured from an oblique direction about a normal line of a display screen is different from the optical characteristic in the normal line. Particularly, a gradation luminance characteristic viewed from the oblique direction, which is parallel or perpendicular to a polarizing axis is largely deviated from a gradation luminance characteristic viewed from a square direction.

In order to solve this problem, a liquid crystal display having a pixel structure including a pixel electrode that is electrically connected to a source electrode of a thin film transistor (TFT) for a pixel and a pixel electrode that is divided from that pixel electrode and is insulated from the source electrode has been known. According to this liquid display, a capacitance is formed by a pixel electrode that is insulated form the source electrode, the source electrode, and an insulation film sandwiched between the both electrodes. The pixel electrode insulated from the source electrode is driven by this capacitance.

FIG. 7 shows a structure of one pixel of a liquid crystal display having a pixel structure including divided two pixel electrodes. As shown in FIG. 7, a plurality of gate bus lines 106 and a plurality of drain bus lines 108 intersecting with the gate bus line 106 via an insulation film (not illustrated) are formed on a glass substrate 103. In the vicinity of the intersection of the gate bus line 106 and the drain bus line 108, a TFT 110 formed for each pixel is arranged. A part of the gate bus line 106 serves as a gate electrode (G) of the TFT 110. On the gate bus line 106, an operational semiconductor layer of the TFT 110 and a channel protective film (both of which are not illustrated) are formed via the insulation film. On the channel protective film of the TFT 110 above the gate electrode (G), a drain electrode (D) along with an n-type impurity semiconductor layer (not shown) underlying the same and a source electrode (S) along with an n-type impurity semiconductor layer (not shown) underlying the same are formed, the electrodes facing each other with a predetermined gap left between them.

In addition, a storage capacitor bus line 114 is formed across pixel regions defined by the gate bus lines 106 and the drain bus line 108 so as to be extended in parallel with the gate bus line 106. A storage capacitor electrode (intermediate electrode) 116 is formed above the storage capacitor bus line 114 for each pixel via an insulation film. The storage capacitor electrode 116 is electrically connected to the source electrode (S) of the TFT 110 through a control electrode 111. A storage capacitor Cs is formed by the storage capacitor bus line 114, the storage capacitor electrode 116, and the insulation film sandwiched between them.

A pixel region defined by gate bus lines 106 and drain bus lines 108 is divided into a sub-pixel A and a sub-pixel B. For example, the sub-pixel A, which has a trapezoidal shape, is disposed on the left side of a central part of the pixel region, and the sub-pixel B is disposed in upper and lower parts of the pixel region and at the right end of the central part excluding the region of the sub-pixel A. For example, the disposition of the sub-pixels A and B in the pixel region is substantially line symmetric about the storage capacitor bus line 114. A pixel electrode 121 is formed at the sub-pixel A, and a pixel electrode 123, which is separated from the pixel electrode 121, is formed at the sub-pixel B. The pixel electrodes 121 and 123 are both constituted by a transparent conductive film such as an ITO. An inter-electrode slit 126 is formed between the pixel electrode 121 and the pixel electrode 123. The inter-electrode slit 126 is formed within the pixel region.

The pixel electrode 121 is electrically connected to the storage capacitor electrode 116 and a source electrode (S) of the TFT 110 through a contact hole 118, on which a protective film (not illustrated) is opened. The pixel electrode 123 has a region which overlaps the control electrode 111 via the protective film and the insulation film. In the same area, a capacitance (a control capacitor) Cc is formed by the control electrode 111, the pixel electrode 123, and the protective film sandwiched between the electrodes 111 and 123.

A common electrode (not illustrated) is formed on an opposite glass substrate (not shown) provided opposite to the glass substrate 103. A linear protrusion 112a serving as an alignment regulating structure for regulating the direction of alignment of a liquid crystal is formed, which protrudes from the opposite glass substrate and is formed in a V-shape above the pixel electrode 121 on the left side of the central part of the pixel region. The linear protrusion 112a is formed so as to be substantially line symmetric about the storage capacitor bus line 114. In addition, a linear protrusion 112b is formed at a position opposite to the control electrode 111 that extends obliquely in the drawing. Further, a linear protrusion 112c is formed so as to protrude from the opposite glass substrate in a position in which it is substantially line symmetric with the linear protrusion 112b about the storage capacitor bus line 114.

An arrangement interval w1 of the linear protrusion 112a at the sub-pixel A and arrangement intervals w2 of the linear protrusions 112b and 112c at the sub-pixel B are formed so as to be substantially the same lengths. In FIG. 7, the arrangement interval w1 the interval is between the edge of the inter-electrode slit 126 and the edge of the linear protrusion 112a that is arranged within the sub-pixel A in adjacent to the inter-electrode slit 126. In the same way, the arrangement interval w2 is the interval between the edge of the inter-electrode slit 126 and each of the edges of the linear protrusions 112b and 112c that are arranged within the sub-pixel B in adjacent to the inter-electrode slit 126. For example, the arrangement intervals w1 and w2 are formed at 25 μm.

At the sub-pixel A, a liquid crystal capacitance Clc1 is formed between the pixel electrode 121, the common electrode, and the liquid crystal sandwiched between the both electrodes. At the sub-pixel B, a liquid crystal capacitance Clc2 is formed between the pixel electrode 123, the common electrode, and the liquid crystal sandwiched between the both electrodes. The liquid crystal capacitance Clc2 is series-connected to the control capacitor Cc between the glass substrate 103 and the opposite glass substrate.

When the TFT 110 is turned on, the electric potentials of the source electrode (S) and the control electrode 111 are the same as that of a gradation voltage $V_D$ applied to the data bus line 108, and at the same time, the electric potential of the pixel electrode 121 electrically connected is also the same as that of the gradation voltage $V_D$. To the liquid crystal capacitance Clc1, a voltage depending on the electric potential difference applied between the pixel electrode 121 and the common electrode is applied. For example, assuming that the voltage applied to the common electrode is 0 V, the voltage to be applied to the liquid crystal capacitance Clc1 becomes a gradation voltage $V_D$ ($=V_D-0$ V). On the other hand, to the pixel electrode 123 that is electrically insulated, the voltage obtained by dividing the gradation voltage $V_D$ according to the capacity ratio between the liquid crystal capacitance Clc2 and the control capacitor Cc is applied. The voltage to be applied to the liquid crystal capacitance Clc2, namely, a voltage $V_1$ to be applied between the common electrode and the pixel electrode 123 can be expressed as follows:

$$V_1 = V_D \times \{Cc/(Clc2+Cc)\} \quad (1)$$

When applying the gradation voltage $V_D$, while the gradation voltage $V_D$ is applied to the pixel electrode 121, the voltage $V_1$ that is lower than the gradation voltage $V_D$ is applied to the pixel electrode 123. Therefore, the gradation voltage $V_D$ in which the liquid crystal located at the sub-pixel B starts to incline from the initial state is higher than the gradation voltage $V_D$ in which the liquid crystal located at the sub-pixel A starts to incline from the initial state. Thus, there is a difference in a threshold voltage (the voltage that the liquid crystal starts to incline from the initial state) between the pixel electrode 121 that is electrically connected to the source electrode (S) and the pixel electrode 123 that is insulated with the source electrode (S). As a result, the luminance gradation characteristic in the oblique direction of the liquid crystal display has been remarkably improved.

FIG. 8 is a graph showing a luminance characteristic (a gradation luminance characteristic) to an input gradation of the liquid crystal display shown in FIG. 7. In the drawing, a horizontal axis represents the input gradation (gray scale) and a vertical axis represents the luminance (T/Twhite), which is standardized at the luminance (Twhite) upon a white display. In the drawing, a curved line represented by a solid line represents a gradation luminance characteristic at a direction vertical to the display screen of the liquid crystal display shown in FIG. 7 (hereinafter, referred to as "a square direction") and a curved line connecting black boxes represents a gradation luminance characteristic in a direction at an azimuth angle of 90° and a polar angle of 60° to the display screen (hereinafter referred to as "an oblique direction"). In the drawing, the curved line connecting black triangles represents a gradation luminance characteristic in the oblique direction of the liquid crystal display in the conventional vertical alignment system in which the pixel electrode is not divided as a comparative example. In this case, the azimuth angle is defined as an angle that is measured in a counter-clockwise direction with reference to the direction to the right of the display screen. A polar angle is an angle to a line vertical to the center of the display screen.

As shown in FIG. 8, in the gradation luminance characteristic in the square direction, the more the input gradation is, the more the luminance is flatly increased and the curved line showing this characteristic is convex downward. On the contrary, in the gradation luminance characteristic in the oblique direction of the conventional liquid crystal display, the luminance in the oblique direction is higher than the luminance in the square direction in the range of gradation levels about 0 to 210, however, the luminance in the oblique direction is lower than the luminance in the square direction in the range gradation levels about 210 and over. On the curved line showing the gradation luminance characteristic in the oblique direction of the conventional liquid crystal display, a part that is largely convex upward and a part that is concave downward are mixed. As a result, when the display screen of the conventional liquid crystal display is seen from the oblique direction, the luminance difference between the input gradations is made small and this leads to generation of missing of gray scale or extending of gray scale and for example, the color of the image appears more whitish.

However, the luminance in the oblique direction of the liquid crystal display shown in FIG. 7 is higher than the luminance in the square direction across the all gradations. On the curved line showing the gradation luminance characteristic in the oblique direction of the liquid crystal display shown in FIG. 7, a part that is largely convex upward and a part that is concave downward are not mixed differently from the curved line showing the gradation luminance characteristic of the conventional liquid crystal display. Therefore, even when the display screen of the liquid crystal display shown in FIG. 7 is seen from the oblique direction, death and spread in the gradation are not generated and it is possible to prevent the color of the image from appearing more whitish. In this way, the gradation luminance characteristic in the oblique direction of the liquid crystal display shown in FIG. 7 has been remarkably improved as compared to that of the conventional liquid crystal display in which the pixel electrode is not divided. Further, in the liquid crystal display having the sub-pixels A and B in one pixel, it is preferable to make the ideal applied voltage of the sub-pixel B at the side of the high threshold voltage about 0.6 to 0.8 times of the applied voltage at the side of the low threshold voltage of the sub-pixel A.

[Patent document 1] JP-A-2004-134954
[Patent document 2] JP-A-2004-071178
[Patent document 3] JP-A-2004-265552
[Patent document 4] JP-A-2003-149647

The gradation luminance characteristic in the oblique direction is improved by the pixel structure of FIG. 7. However, since the voltage applied to the liquid crystal arranged at the sub-pixel B is decreased than the gradation voltage $V_D$ as shown in the expression (1), the luminance of the display screen has been decreased. In order to control this lowering of the luminance at the minimum, in the liquid crystal display shown in FIG. 7, the gradation voltage $V_D$ (a white voltage) for displaying white by the conventional liquid crystal display is set higher. However, this involves a problem shat a response speed of the liquid crystal is delayed when the white voltage is set higher.

SUMMARY OF THE INVENTION

It is an object of the present invention is to provide a liquid crystal display having an excellent display characteristic.

The above-described object is achieved by a liquid crystal display including: an array substrate; an opposite substrate, which is provided opposite to the array substrate; a liquid crystal, which is sealed between the array substrate and the opposite substrate; a plurality of pixel ranges formed on the array substrate in a matrix and including a first sub-pixel, to which a gradation voltage for driving the liquid crystal is applied, and a second sub-pixel, which is formed separated from the first sub-pixel and to which a voltage lower than the gradation voltage is applied; and an alignment regulating structure for regulating the direction of alignment of the liquid crystal, which is formed so that its arrangement interval is different in the first sub-pixel and the second-sub pixel.

DETAILED DESCRIPTION OF THE INVENTION

Figure 1:
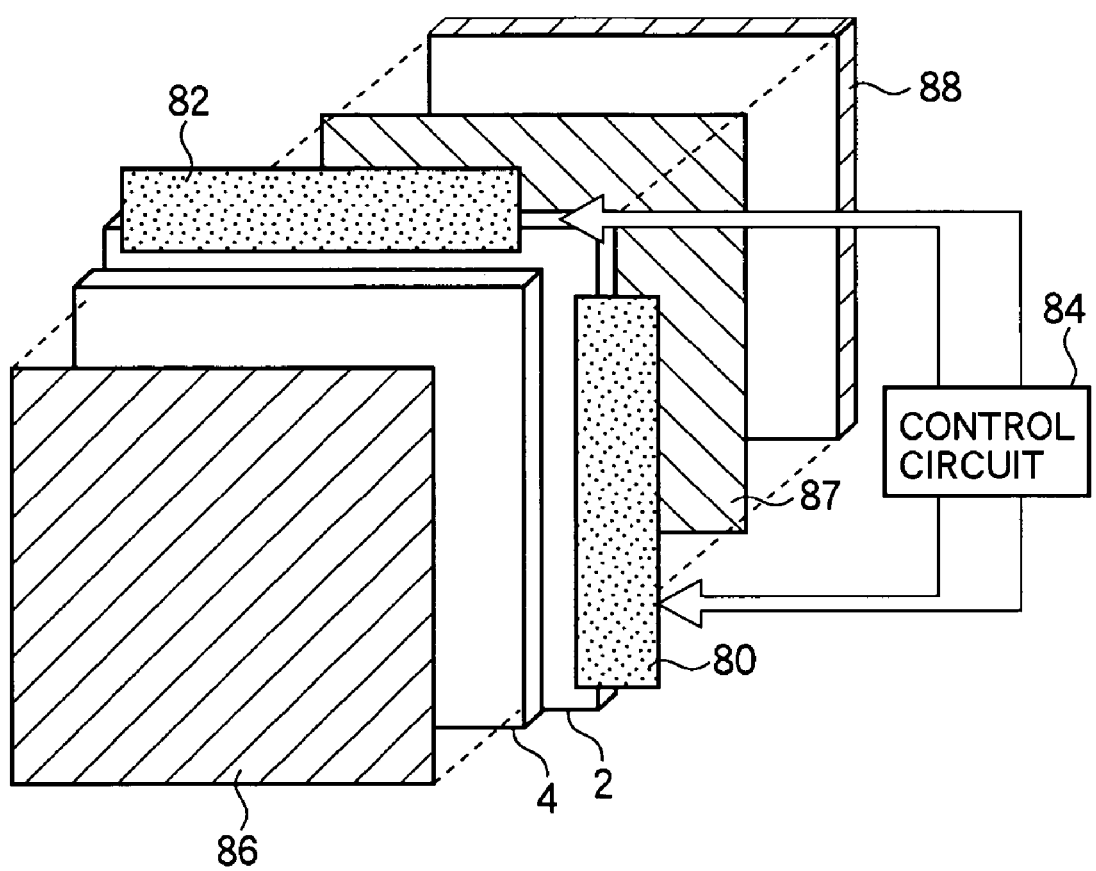
FIG. 1 is a view showing a schematic configuration of a liquid crystal display according to a first embodiment of the invention.

With reference to FIGS. 1 to 6, a liquid crystal display according to a first embodiment of the invention will be described below. At first, the configuration of the liquid crystal display according to the present embodiment will be described employing FIG. 1. FIG. 1 is a view showing a schematic configuration of a liquid crystal display according to a first embodiment of the invention. As shown in FIG. 1, the liquid crystal display includes a TFT substrate 2 having gate bus lines and drain bus lines formed across each other with an insulation film interposed between them and a TFT as a switching element formed at each pixel. In addition, the liquid crystal display is provided with an opposite substrate 4 on which a color filter (CF) and a common electrode are formed and a liquid crystal composition sealed between the both substrates 2 and 4, for example, of which dielectric anisotropy is negative ($\Delta\epsilon=-3.5$). The TFT substrate 2 and the opposite substrate 4 are oppositely arranged, for example, at 4 μm. On a boundary face between the liquid crystal composition and the both substrates 2 and 4, a vertical alignment film is formed, respectively. Thereby, a liquid crystal molecular of the liquid crystal composition when no voltage is applied is aligned substantially perpendicularly to the substrate.

The TFT substrate 2 is connected to a gate bus line driving circuit 80 mounted a driver IC for driving a plurality of gate bus lines and a drain bus line driving circuit 82 mounted a driver IC for driving a plurality of drain bus lines. These driving circuits 80 and 82 output scan signals and data signals to predetermined gate bus lines and drain bus lines based on predetermined signals output by a control circuit 84. A polarizer 87 is provided on a surface of the TFT substrate 2 opposite to the surface thereof on which the TFT elements are formed, and a polarizer 86 is provided on a surface of the opposite substrate 4 opposite to the surface thereof on which the common electrode is formed, the polarizer 86 being in a crossed Nicols relationship with the polarizer 87. A backlight unit 88 is provided on a surface of the polarizer 87 opposite to the surface thereof on the side of the TFT substrate 2.

Figure 2A:
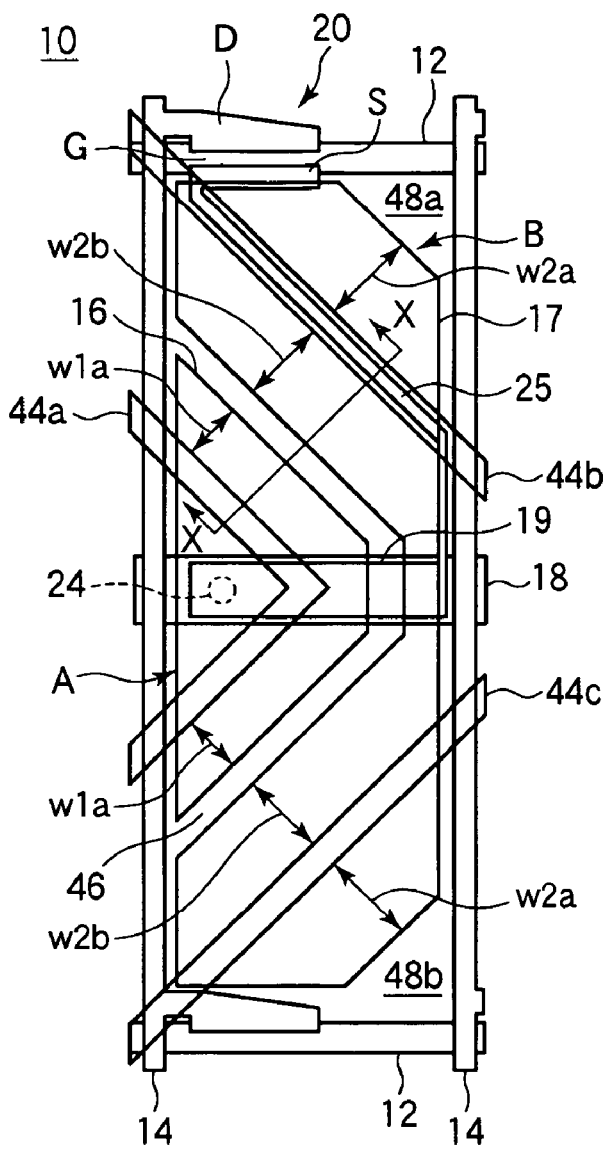
FIG. 2A and FIG. 2B are views showing the configuration of one pixel of the liquid crystal display according to the first embodiment of the invention.
Figure 2B:
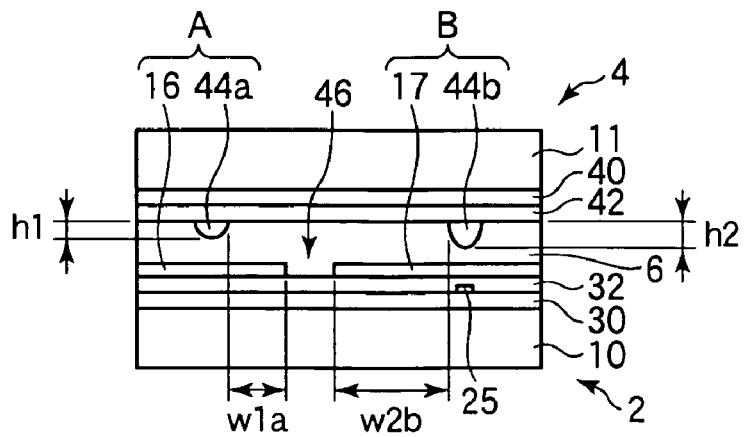

FIG. 2A and FIG. 2B are views showing the configuration of one pixel of the liquid crystal display according to the first embodiment of the invention. FIG. 2A shows the configuration of one pixel among a plurality of pixels formed in a matrix with an array substrate 10 made of an insulation material such as a glass material seen in a normal line direction. FIG. 2B shows a section cut at an X-X line shown in FIG. 2A. As shown in FIG. 2A and FIG. 2B, a plurality of gate bus lines 12 and a plurality of drain bus lines 14 formed across with the gate bus lines 12 are formed on the array substrate 10 via an insulating film 30. In the vicinity of the intersection of the gate bus lines 12 and the drain bus lines 14, a TFT 20 as a switching element formed for each pixel is arranged. A part of the gate bus line 12 serves as a gate electrode (G) of the TFT 20. On the gate bus line 12, an operational semiconductor layer of the TFT 20 and a channel protective film (both of which are not illustrated) are formed via the insulation film. On the channel protective film of the TFT 20 above the gate electrode (G), a drain electrode (D) along with an n-type impurity semiconductor layer (not shown) underlying the same and a source electrode (S) along with an n-type impurity semiconductor layer (not shown) underlying the same are formed, the electrodes facing each other with a predetermined gap left between them.

In addition, a storage capacitor bus line 18 is formed across pixel regions defined by the gate bus lines 12 and the drain bus line 14 so as to extend in parallel with the gate bus line 12. A storage capacitor electrode (intermediate electrode) 19 is formed above the storage capacitor bus line 18 for each pixel via an insulation film 30. The storage capacitor electrode 19 is electrically connected to the source electrode (S) of the TFT 20 through a control electrode 25. A storage capacitor Cs is formed by the storage capacitor bus line 18, the storage capacitor electrode 19, and the insulation film 30 sandwiched between them.

A pixel region defined by gate bus lines 12 and drain bus lines 14 is having a sub-pixel (a first sub-pixel) A to which a gradation voltage $V_D$ (a voltage corresponding to a gradation value of the input image data) for driving a liquid crystal layer 6 is applied and a sub-pixel (a second sub-pixel) B which is separated from the sub-pixel A and to which a voltage lower than the gradation voltage $V_D$ is applied. The liquid crystal display is designed such that the area ratio between a sub-pixel A and a sub-pixel B is, for example, 4:6. For example, the sub-pixel A, which has a trapezoidal shape, is disposed on the left side of a central part of the pixel region, and the sub-pixel B is disposed in upper and lower parts of the pixel region and at the right end of the central part excluding the region of the sub-pixel A. For example, the disposition of the sub-pixels A and B in the pixel region is substantially line symmetric about the storage capacitor bus line 18.

A pixel electrode (a first pixel electrode) 16 is formed at the sub-pixel A, and a pixel electrode (a second pixel electrode) 17, which is separated from the pixel electrode 16, is formed at the sub-pixel B. The pixel electrodes 16 and 17 are both constituted by a transparent conductive film such as an ITO. An inter-electrode slit 46 is formed between the pixel electrode 16 and the pixel electrode 17. The inter-electrode slit 46 is extended obliquely to the end of the pixel region, the inter-electrode slit 46 is formed within the pixel region at a slit width, for example, from 6 μm to 12 μm. The inter-electrode slit 46 also serves as an alignment regulating structure for regulating the direction of alignment of liquid crystal molecules of the liquid crystal layer 6, which is disposed at the side of the TFT substrate 2.

In FIG. 2A, pixel electrode cut ranges 48a and 48b in which the angle of the pixel electrode 17 is cut are formed upper right and lower right of the sub-pixel B, respectively. Sides where the pixel electrode cut ranges 48a and 48b contact the pixel electrode 17 respectively (edge portions of the pixel electrode cut ranges 48a and 48b) are located in parallel with the inter-electrode slit 46, respectively to be extended obliquely to the pixel range end portion. The pixel electrode cut ranges 48a and 48b also serves as the alignment regulating structure for regulating the direction of alignment at the sub-pixel B.

The pixel electrode 16 is electrically connected to the storage capacitor electrode 19 and a source electrode (S) of the TFT 20 through a contact hole 24, on which a protective film 32 is opened. Thereby, the pixel electrode 16 is connected to the TFT 20. The pixel electrode 17 has a region which overlaps the control electrode 25 via the protective film 32. In the same area, a capacitance (a control capacitor) Cc is formed by the control electrode 25, the pixel electrode 17, and the protective film 32 sandwiched between the both electrodes 17 and 25. The pixel electrode 17 is connected to the TFT 20 by capacity coupling through the control capacitor Cc and the pixel electrode 17 is in an electrical floating state.

On an opposite insulation substrate 11 made of an insulation material such as a glass material and provided opposite to an array substrate 10, a CF resin layer 40 and a common electrode 42 are formed in this order. A V-shaped linear protrusion (a bank-shaped structure) 44a serving as an alignment regulating structure for regulating the direction of alignment of liquid crystal molecules of the liquid crystal layer 6 is formed so as to protrude from the opposite insulation substrate 11 and be arranged on the pixel electrode 16 on the left side of the central part of the pixel region. The linear protrusion 44a is substantially line symmetric about the storage capacitor bus line 18. In addition, a linear protrusion (a bank-shaped structure) 44b is formed at a position opposite to the control electrode 25 which is obliquely extended in FIG. 2A. Further, a linear protrusion (a bank-shaped structure) 44c is formed so as to protrude from the opposite insulation substrate 11. The linear protrusion 44c is substantially line symmetric with the linear protrusion 44b about the storage capacitor bus line 18. The liner protrusions 44a, 44b, and 44c are made of, for example, a dielectric material.

An arrangement interval (a first arrangement interval) w1 the alignment regulating structure for regulating the direction of alignment at the sub-pixel A and an arrangement interval w2 of (a second arrangement interval) of the alignment regulating structure for regulating the direction of alignment at the sub-pixel B are formed so as to be different lengths. The arrangement interval w1 is the average value of structure intervals of the adjacent alignment regulating structures for regulating the direction of alignment in the sub-pixel A and the intervals of the alignment regulating structures for regulating the direction of alignment in adjacent to the inter-electrode slit 46 and the edge portion of the inter-electrode slit 46. According to the present embodiment, since the alignment regulating structure for regulating the direction of alignment formed in the sub-electrode A is only the liner protrusion 44a, the arrangement interval w1 is an interval w1a between the edge portion of the liner protrusion 44a and the edge portion of the inter-electrode slit 46.

On the other hand, the arrangement interval w2 is an average value of structure intervals of the adjacent alignment regulating structures for regulating the direction of alignment in the sub-pixel B and the intervals of the alignment regulating structures for regulating the direction of alignment in adjacent to the inter-electrode slit 46 and the edge portion of the inter-electrode slit 46. According to the present embodiment, the alignment regulating structure for regulating the direction of alignment formed in the sub-electrode B is the linear protrusions 44b, 44c and the pixel electrode cut ranges 48a and 48b. Therefore, the arrangement interval w2 is the average value (w2=(w2a+w2b)/2) between a structure interval w2a between each of the edge portions of the linear protrusions 44b and 44c and each of the edge portions of the pixel electrode cut ranges 48a and 48b and an interval w2b between the edge portion of the inter-electrode slit 46 and the edge portions of the linear protrusions 44b and 44c.

The arrangement interval w1 is formed so as to be shorter than the arrangement interval w2. For example, the arrangement interval w1 is formed in 20 μm and the arrangement interval w2 is formed in 25 μm. The arrangement interval w1 is formed so as to be shorter than the arrangement interval w2 by 5 μm.

As described later, if the arrangement interval of the alignment regulating structure for regulating the direction of alignment is made shorter, the alignment regulating force of liquid crystal molecules of the liquid crystal layer 6 is made stronger and this makes it possible to increase the response speed of the liquid crystal layer 6. Accordingly, by making the arrangement interval w1 in the sub-pixel A to which a relatively high voltage is applied shorter, the response speed of the liquid crystal layer 6 of the liquid crystal display of the present embodiment can be increased than the response speed of the liquid crystal layer 6 of the conventional liquid crystal display.

In addition, an interval w2a between the linear protrusion 44b and the pixel electrode cut range 48a is substantially the same as an interval w2b between the linear protrusion 44b and the edge portion of the inter-electrode slit 46. Thereby, the liquid crystal molecular is aligned so as to be substantially symmetric about the linear protrusion 44b. In the same way, an interval w2a between the linear protrusion 44c and the pixel electrode cut range 48b is substantially the same as the interval w2b between the linear protrusion 44c and the edge portion of the inter-electrode slit 46. Thereby, the liquid crystal molecular is aligned so as to be substantially symmetric about the linear protrusion 44c.

As shown in FIG. 2B, a height h1 from the top of the linear protrusion 44a formed within the sub-pixel A to the common electrode 42 is formed so as to be lower than a height h2 of the linear protrusion 44b formed within the sub-pixel B. For example, the height h1 of the linear protrusion 44a is formed so as to be 1.0 μm and the height h2 of the linear protrusion 44b is formed so as to be 1.4 μm. The height h2 of the linear protrusion 44c is also formed so as to be 1.4 μm in the same way as the linear protrusion 44b (its illustration is herein omitted). Further, the linear protrusions 44a, 44b, and 44c may be formed so as to be the same heights unless the height h1 of the linear protrusion 44a is formed so as to be higher than the heights h2 of the linear protrusions 44b and 44c. The linear protrusions 44a, 44b, and 44c may be formed in the range from 0.7 μm to 1.4 μm.

As described later, the height of the linear protrusion is made lower, the voltage applied between the linear protrusion and the substrate opposite to the linear protrusion (the TFT substrate or the opposite substrate) is made higher. Therefore, the alignment regulating force of the liquid crystal molecular of the liquid crystal layer 6 is made larger, the response speed of the liquid crystal layer 6 can be increased. As a result, by making the height h1 of the linear protrusion 44a to which a relatively high voltage is applied lower, the response speed of the liquid crystal layer 6 of the liquid crystal display of the present embodiment can be increased than the response speed of the liquid crystal layer 6 of the conventional liquid crystal display.

At the sub-pixel A, a liquid crystal capacitance Clc1 is formed by the pixel electrode 16, the common electrode 42, and the liquid crystal layer 6 sandwiched between the both electrodes 16 and 42. At the sub-pixel B, a liquid crystal capacitance Clc2 is formed by the pixel electrode 17, the common electrode 42, and the liquid crystal layer 6 sandwiched between the both electrodes 17 and 42. The liquid crystal capacitance Clc2 is series-connected to the control capacitor Cc between the array substrate 10 and the opposite glass substrate 11.

A voltage Vpx2 applied to the liquid crystal capacitance Clc2 at the sub-pixel B when the TFT 20 is turned on is obtained from the above-described Expression (1). In other words, the voltage V1 of Expression (1) corresponds to the voltage Vpx2. The liquid crystal display of the present embodiment is designed so that a voltage ratio Vpx2/Vpx1 of the voltage Vpx2 applied to the liquid crystal capacitance Clc2 at the sub-pixel B to a voltage Vpx1 applied to the liquid crystal capacitance Clc1 at the sub-pixel A is set at, for example, about 0.8. In addition, in the liquid crystal display of the present embodiment, the white voltage of the sub-pixel A is set at about 6.8 V so that the luminance of the display screen is not lowered. Therefore, the white voltage of the sub-pixel B is about 5.7 V (=6.8 V×0.8). When applying the gradation voltage $V_D$, while the gradation voltage $V_D$ is applied to the liquid crystal capacitance Clc1 of the sub-pixel A, the voltage $V_1$ that is lower than the gradation voltage $V_D$ is applied to the liquid crystal capacitance Clc2 of the sub-pixel B. Therefore, the gradation voltage $V_D$ in which the liquid crystal molecular of the liquid crystal layer 6 located at the sub-pixel B starts to incline from the initial state is higher than the gradation voltage $V_D$ in which the liquid crystal molecular of the liquid crystal layer 6 located at the sub-pixel A starts to incline from the initial state. Thus, there is a difference in a threshold voltage (the voltage that the liquid crystal starts to incline from the initial state) between the pixel electrode 16 that is electrically connected to the source electrode (S) and the insulated pixel electrode 17. As a result, the luminance gradation characteristic in the oblique direction of the liquid crystal display according to the present embodiment has been remarkably improved.

Next, a method of setting the arrangement interval and the height of the alignment regulating structure for regulating the direction of alignment formed in the liquid crystal display according to the present embodiment will be described below with reference to FIGS. 3 to 5. At first, a relation between the interval (the arrangement interval) of the alignment regulating structure for regulating the direction of alignment of the liquid crystal molecular in the pixel range and the response speed (the response time) of the liquid crystal molecular at the white voltage will be described. The response time in the case of changing the display screen from black (the voltage applied to the liquid crystal is defined as Vb) into white (the voltage applied to the liquid crystal is defined as Vw) is defined as follows. The luminance of the display screen is standardized so that the luminance at a normal state at the voltage Vb (or a transmittance) is 0% and the luminance of the display screen at a normal state at the voltage Vw (or the transmittance) is 100%. Then, the time that the luminance of the display screen is changed from 10% to 90% is defined as a rising response time τr and the time that the luminance of the display screen is changed from 90% to 10% is defined as a falling response time τf.

Figure 7:
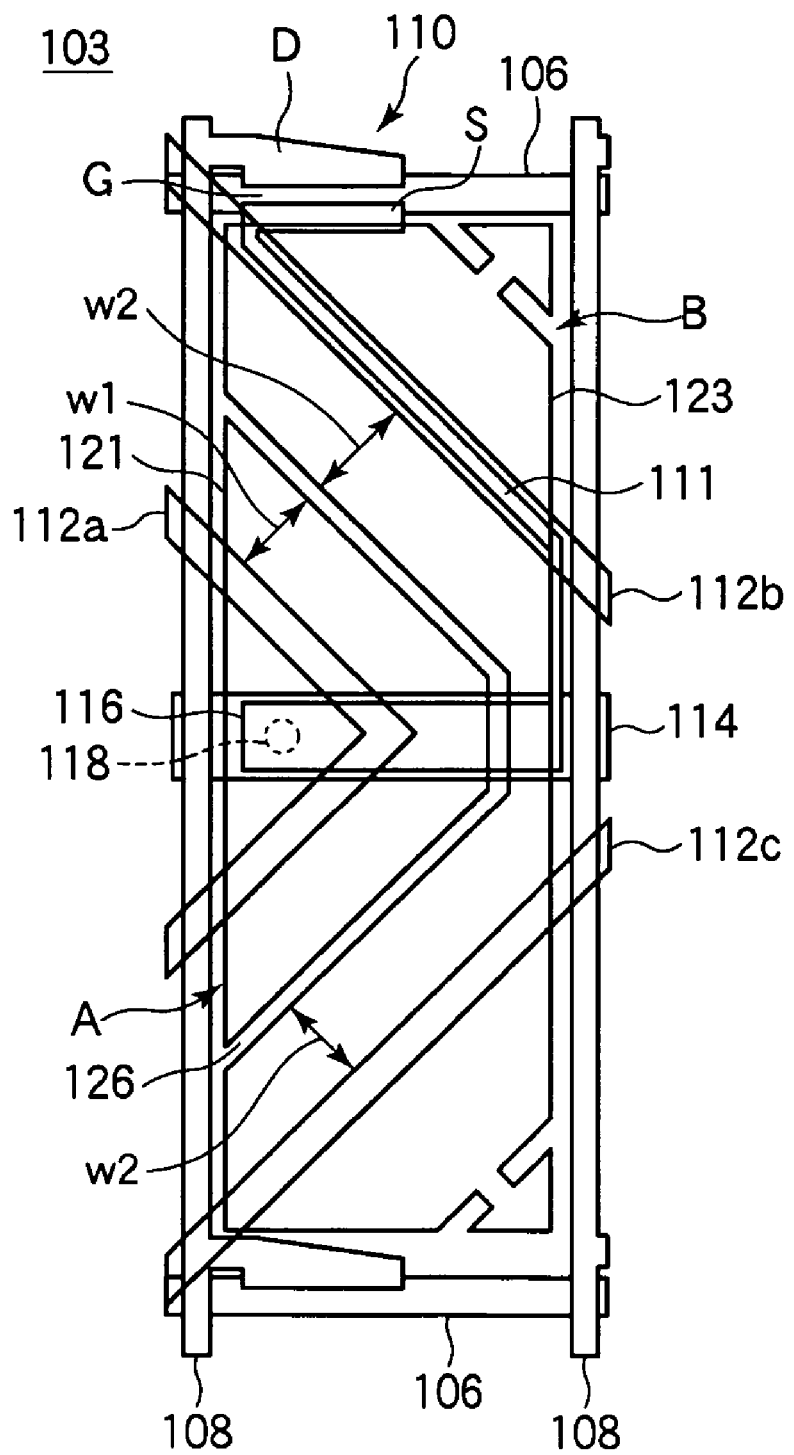
FIG. 7 is a view showing the configuration of one pixel of a conventional liquid crystal display.
Figure 8:
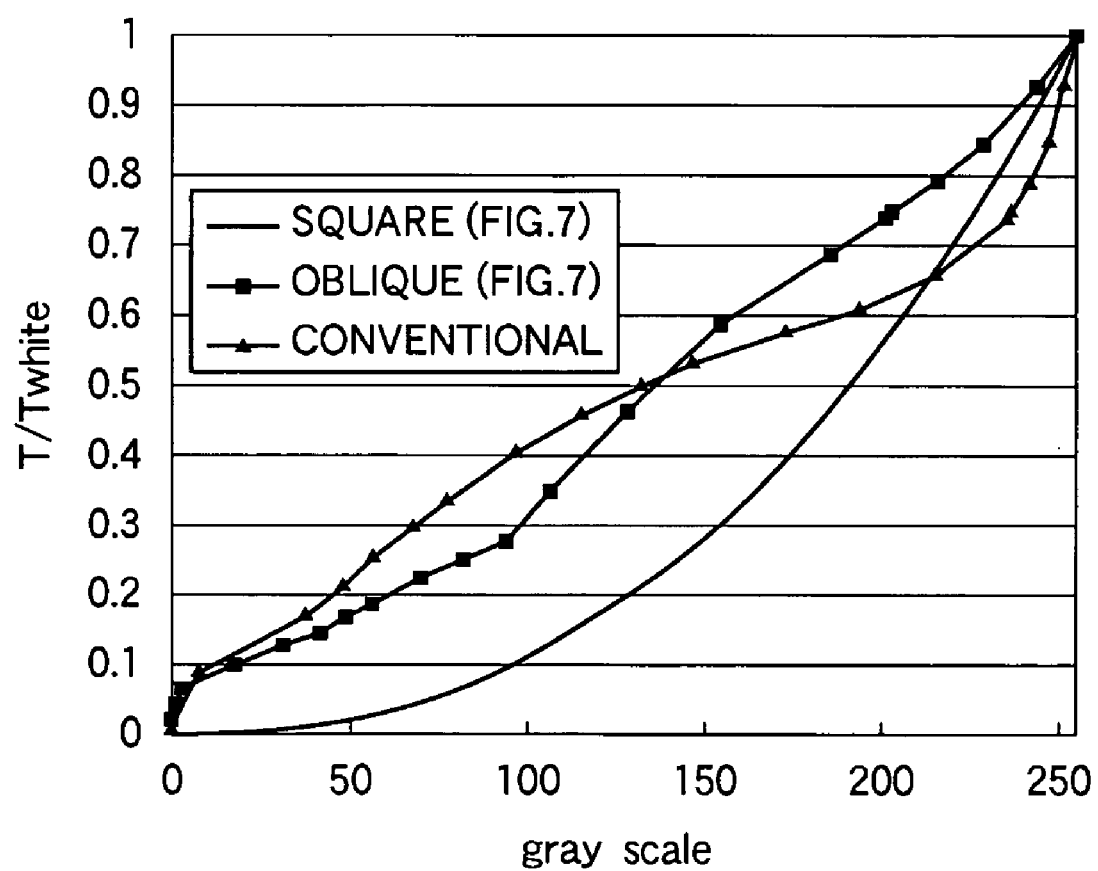
FIG. 8 is a view showing a luminance characteristic to an input gradation of the conventional liquid crystal display shown in FIG. 7.

According to the present embodiment, the rising response time τr of the liquid crystal display shown in FIG. 2A having one pixel configured by two sub-pixels A and B, of which threshold voltages are different, is improved. In other words, in the liquid crystal display of a normally black, the response time when the display screen is changed from black into white is improved. In the conventional liquid crystal display, of which one pixel is not divided, the arrangement interval of the alignment regulating structure for regulating the direction of alignment is regularly formed at the substantially same value, for example, 25 μm. In the same way, in the conventional liquid crystal display shown in FIG. 7, the arrangement interval w1 of the linear protrusion 112a at the sub-pixel A and the arrangement interval w2 of the linear protrusions 112b and 112c at the sub-pixel B are regularly formed at the substantially same value, for example, 25 μm. However, as described above, in the liquid crystal display shown in FIG. 7, in order to prevent decrease of the luminance of the display screen and to obtain a sufficient luminance, the white voltage is set at a rather high value, namely, about 6.8 V. As a result, the rising response time τr of the liquid crystal display is deteriorated.

Figure 3:
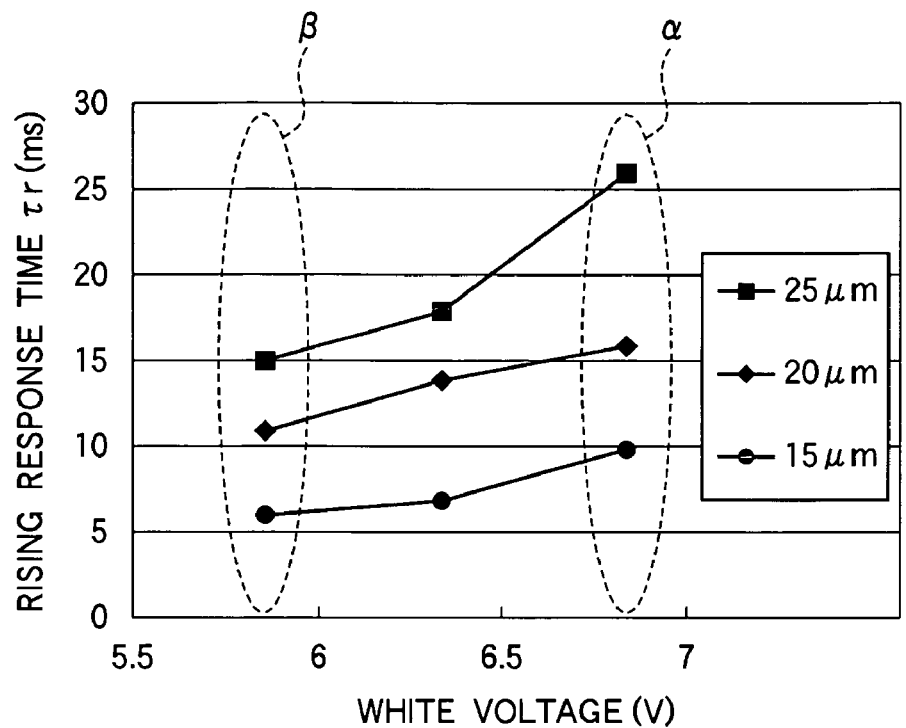
FIG. 3 is a view showing a relation between a white voltage and a rising response time τr of a liquid crystal of the liquid crystal in the liquid crystal display according to the first embodiment of the invention.

FIG. 3 is a graph showing a relation between the white voltage and the rising response time τr of the liquid crystal. The horizontal axis represents the white voltage (V) and the vertical axis represents the rising response time τr (ms) of the liquid crystal. In the drawing, the curved line connecting black boxes represents a relation between the white voltage and the rising response time τr of the liquid crystal when the arrangement interval of the alignment regulating structure for regulating the direction of alignment is 25 μm. The curved line connecting black rhombuses represents a relation between the white voltage and the rising response time τr of the liquid crystal when the arrangement interval of the alignment regulating structure for regulating the direction of alignment is 20 μm. The curved line connecting black circles represents a relation between the white voltage and the rising response time τr of the liquid crystal when the arrangement interval of the alignment regulating structure for regulating the direction of alignment is 15 μm. In addition, in the drawing, a voltage surrounded by a broken line α represents the white voltage applied to the liquid crystal in the sub-pixel A and a voltage surrounded by a broken line β represents the white voltage applied to the liquid crystal in the sub-pixel B.

As shown in FIG. 3, the higher the white voltage is, the more the rising response time τr of the liquid crystal is delayed. In the conventional liquid crystal display shown in FIG. 7, the arrangement interval w1 of the linear protrusion 112a at the sub-pixel A is 25 μm and the white voltage is set at about 6.8 V. Therefore, in the sub-pixel A, particularly, the response time of the liquid crystal is remarkably deteriorated. Thus, it is conceivable that the response time of the liquid crystal is delayed if the white voltage is set higher because the liquid crystal molecular responds in a random direction at a gap of which regulating force to regulate the liquid crystal molecular of the alignment regulating structure for regulating the direction of alignment is weak due to increase of the white voltage. On the other hand, at the sub-pixel B of the conventional liquid crystal display shown in FIG. 7, the arrangement intervals w2 of the linear protrusions 112b and 112c are 25 μm, however, the voltage applied to the liquid crystal is low, namely, 5.7 V, so that substantially the same white voltage as that of the conventional liquid crystal display is applied. Therefore, as the rising response time τr of the liquid crystal at the sub-pixel B, substantially the same response time (about 15 ms) as that of the conventional liquid crystal display can be obtained.

As shown in FIG. 3, the rising response time τr of the liquid crystal can be made shorter by narrowing the arrangement interval of the alignment regulating structure for regulating the direction of alignment. In addition, in order to make the rising response time τr of the liquid crystal in the sub-pixel A of a low threshold voltage the same as that of the sub-pixel B of a high threshold voltage, it is necessary to narrow the arrangement interval of the alignment regulating structure for regulating the direction of alignment at the sub-pixel A than the arrangement interval of the alignment regulating structure for regulating the direction of alignment at the sub-pixel B -by about 5 μm. Therefore, in the liquid crystal display according to the present embodiment, the arrangement intervals w2 of the linear protrusions 44b and 44c in the sub-pixel B of the high threshold voltage are set at 25 μm as same as the conventional liquid crystal display and the arrangement interval w1 of the linear protrusion 44a in the sub-pixel A of the low threshold voltage is set at 20 μm. Thereby, even if the white voltage is set at a high value, namely, 6.8 V, the rising response time τr of the liquid crystal in the sub-pixel A is made to about 15 ms that is substantially the same as that of the sub-pixel B. Further, since the white voltage to be applied to the sub-pixel A is 6.8 V in the liquid crystal display according to the present embodiment, it is possible to prevent the luminance of the display screen from being lowered.

Figure 4:
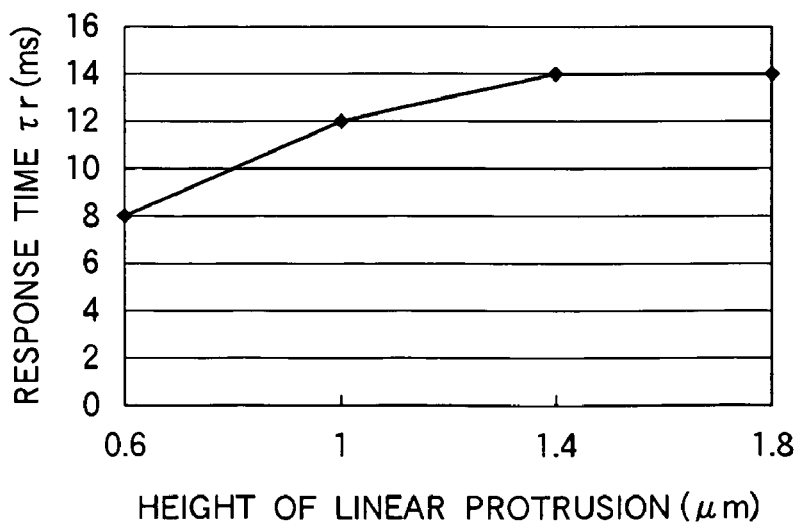
FIG. 4 is a view showing a relation between a height of a linear protrusion and the rising response time τr of the liquid crystal in the liquid crystal of the liquid crystal display according to the first embodiment of the invention.

FIG. 4 is a graph showing a relation between the height of the linear protrusion and the rising response time τr of the liquid crystal. The horizontal axis represents the height of the linear protrusion (μm) and the vertical axis represents the rising response time τr (ms) of the liquid crystal. The rising response time τr of the liquid crystal shown in FIG. 4 is a simulation result in the case that the arrangement intervals of the linear protrusions are 20 μm and the interval between the TFT substrate and the opposite substrate is assumed to be 4 μm.

As shown in FIG. 4, the higher the linear protrusion is, the more the rising response time τr of the liquid crystal is delayed. For example, when the linear protrusion is formed at the side of the opposite substrate, if the linear protrusion is higher, the gap between the top of the linear protrusion and the TFT substrate opposite to this top is made shorter. In addition, when the linear protrusion is formed at the side of the TFT substrate, if the linear protrusion is higher, the gap between the top of the linear protrusion and the opposite substrate opposite to this top is made shorter. Therefore, the voltage to be applied to the liquid crystal of this gap is lower and the force for regulating the direction of alignment of the liquid crystal molecular is lowered, so that the response time of the liquid crystal is delayed. Therefore, in the liquid crystal display according to the present embodiment, the height h1 of the linear protrusion 44a in the sub-pixel A is set at about 1.0 μm so that the rising response time τr of the liquid crystal about 12 ms can be obtained at the sub-pixel A of the low threshold voltage. If the rising response time τr of the liquid crystal about 15 ms can be obtained, the height h1 of the linear protrusion 44a is not limited to 1.0 μm and for example, the height h1 of the linear protrusion 44a may be formed to be 0.7 μm to 1.4 μm. Further, it is obvious that the heights of the linear protrusions 44b and 44c in the sub-pixel B of the high threshold voltage may be formed to be 0.7 μm to 1.4 μm.

In place of the linear protrusion 44a, the liquid crystal display according to the present embodiment may include a first pixel electrode slit formed in a V-shape by removing a part of the pixel electrode 16 serving as the alignment regulating structure for regulating the direction of alignment of the liquid crystal or a first common electrode slit formed in a V-shape by removing a part of the common electrode 42 opposite to the pixel electrode 16 at a position that is substantially the same as the position where the linear protrusions 44b and 44c are formed seeing the array substrate 10 in a normal line direction. In the same way, in place of the linear protrusions 44b and 44c, the liquid crystal display according to the present embodiment may include a second pixel electrode slit formed by removing a part of the pixel electrode 17 serving as the alignment regulating structure for regulating the direction of alignment of the liquid crystal or a second common electrode slit formed by removing a part of the common electrode 42 opposite to the pixel electrode 17 at a position that is substantially the same as the positions where the linear protrusions 44b and 44c are formed seeing the array substrate 10 in a normal line direction. It is also possible to align the liquid crystal using these respective electrode slits.

Figure 5:
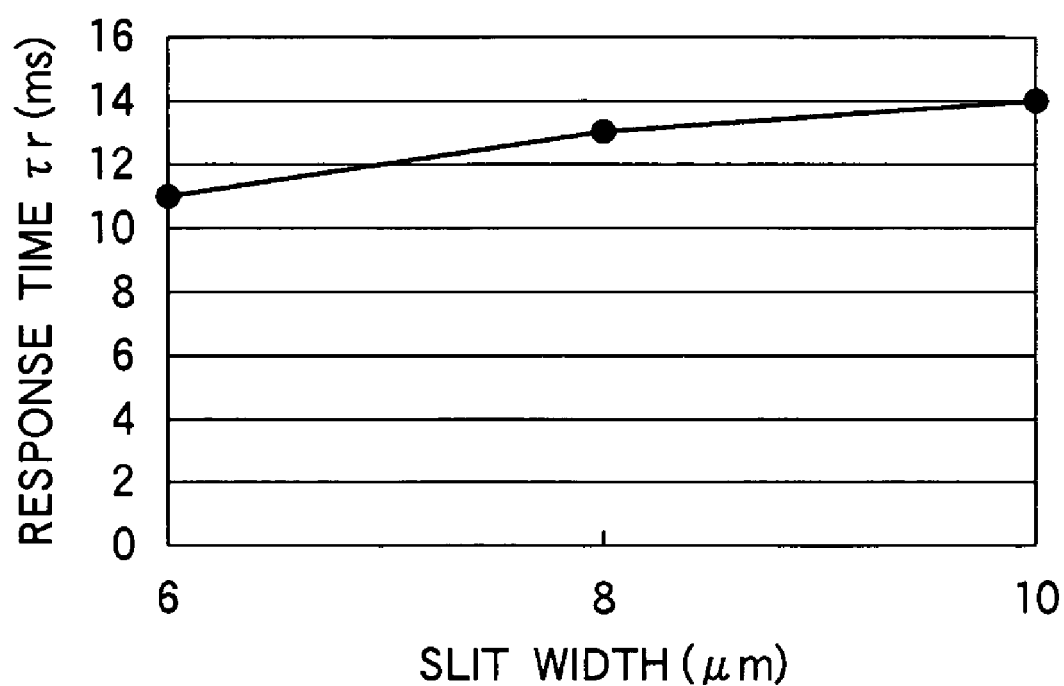
FIG. 5 is a view showing a relation between each slit width of first and second pixel electrode slits, first and second common electrode slits or an inter-electrode slit and the rising response time τr of the liquid crystal in the liquid crystal of the liquid crystal display according to the first embodiment of the invention.

FIG. 5 is a graph showing a relation between each slit width of the first and the second pixel electrode slits, the first and the second common electrode slits or the inter-electrode slit and the rising response time τr of the liquid crystal. The horizontal axis represents the each slit width (μm) and the vertical axis represents the rising response time τr (ms) of the liquid crystal. The rising response time τr of the liquid crystal shown in FIG. 5 is a simulation result in the case that the arrangement interval of each slit is 20 μm and the interval between the TFT substrate and the opposite substrate is assumed to be 4 μm.

As shown in FIG. 5, the longer the slit width is, the more the rising response time τr of the liquid crystal is delayed. If the slit width is longer, the force for regulating the direction of alignment of the liquid crystal is decreased, so that the response time of the liquid crystal is delayed. Therefore, the liquid crystal display according to the present embodiment is configured so that the width of the first pixel electrode slit in the sub-pixel A of the low threshold voltage and the width of the second pixel electrode slit in the sub-pixel B of the high threshold voltage are different. The first and the second pixel electrode slits are formed in a width from 6 μm to 12 μm and the width of the first pixel electrode is narrower than that of the second pixel electrode. Thereby, as shown in FIG. 5, it is possible to make the rising response time τr of the liquid crystal 15 ms and below both in the sub-pixels A and B. Further, since the width of the first pixel electrode slit is narrower than that of the second pixel electrode slit, it is possible to improve the response time of the sub-pixel A having a longer response time more in the conventional liquid crystal display.

In the same way, the liquid crystal display according to the present embodiment is configured so that the width of the first common electrode slit in the sub-pixel A of the low threshold voltage and the width of the second common electrode slit in the sub-pixel B of the high threshold voltage are different. The first and the second common electrode slits are formed in a width from 6 μm to 12 μm and the width of the first common electrode is narrower than that of the second common electrode. Thereby, as shown in FIG. 5, it is possible to make the rising response time τr of the liquid crystal 15 ms and below both in the sub-pixels A and B. Further, since the width of the first common electrode slit is narrower than that of the second common electrode slit, it is possible to improve the response time of the sub-pixel A having a longer response time more in the conventional liquid crystal display.

As described above, according to the present embodiment, the liquid crystal display has the pixel range including the sub-pixels A and B, in which threshold voltages are different and the arrangement intervals w1 and w2 of the alignment regulating structure for regulating the direction of alignment are different. Thereby, in the liquid crystal display, it is possible to improve the luminance gradation characteristic in the oblique direction and to speed up the response speed of the liquid crystal layer 6.

Figure 6:
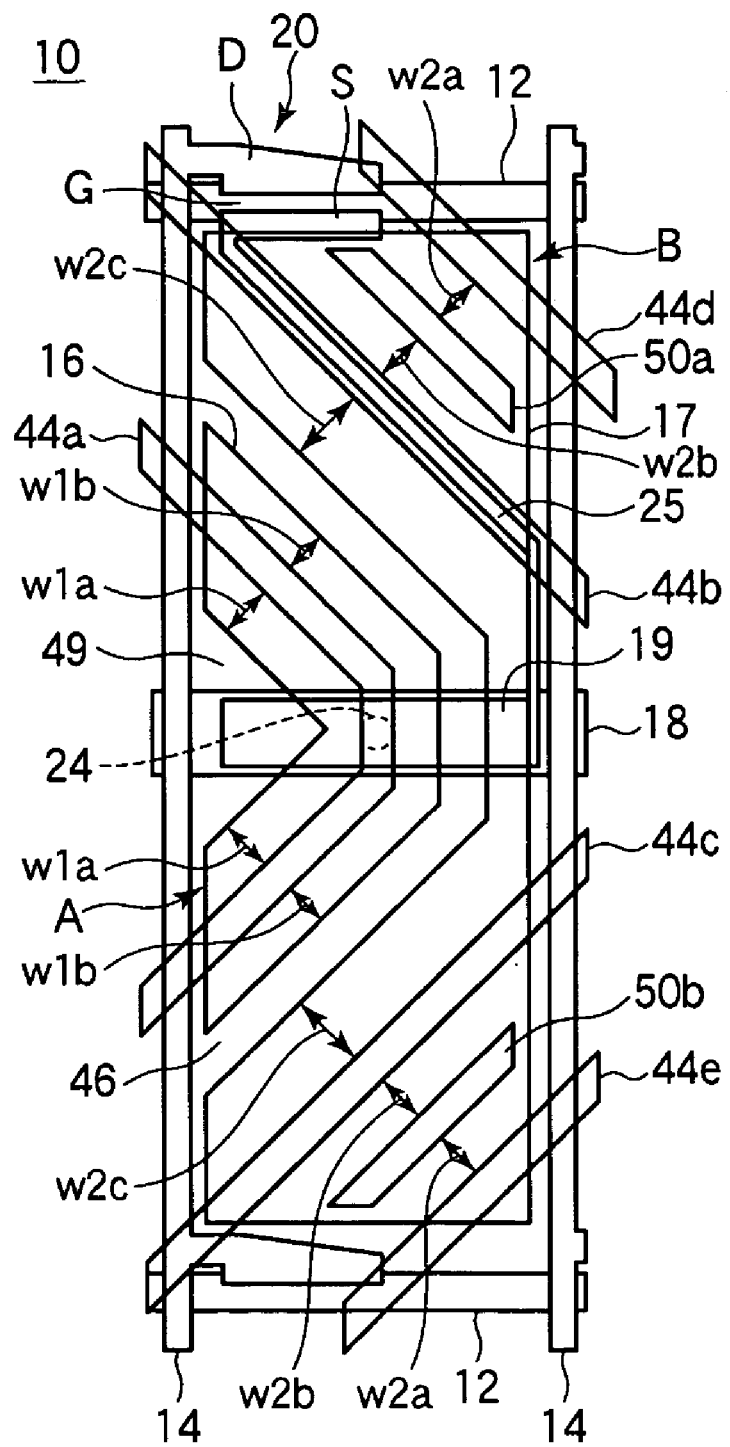
FIG. 6 is a view showing the configuration of one pixel of a liquid crystal display of a modified example of the first embodiment of the invention.

Next, the modified example of the liquid crystal display according to the present embodiment will be described with reference to FIG. 6. The liquid crystal display according to the modified example is characterized by including a plurality of the alignment regulating structures for regulating the direction of alignment within the sub-pixels A and B. FIG. 6 shows the configuration of one pixel of the liquid crystal display of the modified example. FIG. 6 shows the configuration of one pixel among a plurality of pixels formed in a matrix. FIG. 6 shows a configuration of one pixel among a plurality of pixels formed in the shape of matrix when viewing the array substrate 10 in the direction of normal line. As shown in FIG. 6, a pixel electrode cut range 49 with the pixel electrode 16 cut in a triangle is formed on the left side of the central part of the sub-pixel A. The pixel electrode cut range 49 is substantially line symmetric about the storage capacitor bus line 18. Sides where the pixel electrode cut range 49 contacts the pixel electrode 16 (edge portion of the pixel electrode cut range 49) are located in parallel with the inter-electrode slit 46 to be extended obliquely to the pixel range end portion. The pixel electrode cut range 49 also serves as the alignment regulating structure for regulating the direction of alignment at the sub-pixel A.

On the other hand, the linear protrusion 44d formed at the side of the opposite substrate 4 (not illustrated in FIG. 6) is arranged upper right of the sub-pixel B in parallel with the linear protrusion 44b. Further, a pixel electrode slit 50a formed by removing a part of the pixel electrode 17 is arranged at the center of the gap between the linear protrusions 44b and 44d. The pixel electrode slit 50a is formed so as to be extended substantially in parallel with the linear protrusions 44b and 44d. In the same way, the linear protrusion 44e formed at the side of the opposite substrate 4 is arranged lower right of the sub-pixel B in parallel with the linear protrusion 44c. Further, a pixel electrode slit 50b formed by removing a part of the pixel electrode 17 is arranged at the center of the gap between the linear protrusions 44c and 44e. The pixel electrode slit 50b is formed so as to be extended substantially in parallel with the linear protrusions 44c and 44e. The pixel electrode slits 50a and 50b are substantially line symmetric about the storage capacitor bus line 18. In addition, the pixel electrode slits 50a and 50b also serve as the alignment regulating structure for regulating the direction of alignment at the sub-pixel B.

The arrangement interval w1 of the alignment regulating structure for regulating the direction of alignment at the sub-pixel A is the average value (w1=(w1a+w2b)/2) of the structure interval w1a between the edge portion of the pixel electrode cut range 49 and the edge portion of the liner protrusion 44a and the structure interval w1b between the edge portion of the liner protrusion 44a and the edge portion of the inter-electrode slit 46. On the other hand, the arrangement interval w2 of the alignment regulating structure for regulating the direction of alignment at the sub-pixel B is the average value (w2=(w2a+w2b+w2c)/3) of the structure interval w2a between the edge portions of the liner protrusions 44d and 44e and the edge portions of the inter-electrode slit 50a and 50b, the structure interval w2b between the edge portions of the inter-electrode slit 50a and 50b and the edge portions of the liner protrusions 44b and 44c, and the structure interval w2c between the edge portions of the liner protrusions 44b and 44c and the edge portion of the inter-electrode slit 46.

Also in the modified example, the arrangement interval w1 is formed so as to be shorter than the arrangement interval w2. For example, the arrangement interval w1 is formed so as to be shorter than the arrangement interval w2 by 5 μm and above. Thereby, the same advantage as that of the above-described embodiment can be obtained.

In the present invention, various modifications are available other than the above-described embodiment.

The liquid crystal display according to the above-described embodiment has any one from among the linear protrusions 44a, 44b, 44c serving as the alignment regulating structure for regulating the direction of alignment or the first and the second pixel electrode slits or the first and the second common electrode slits, however, the present invention is not limited to this. For example, even if the linear protrusions 44a, 44b, 44c serving as the alignment regulating structure for regulating the direction of alignment or the first and the second pixel electrode slits or the first and the second common electrode slits are mixed in the liquid crystal display, the advantage same as the above-described embodiment can be obtained.

In addition, in the liquid crystal display according to the present embodiment, the rising response time τr of the liquid crystal is improved by optimizing the arrangement interval w1 and the height h1 of the linear protrusion 44a, however, the present invention is not limited to this. The same advantage as the above-described embodiment can be obtained, for example, by optimizing only the arrangement interval w1 of the linear protrusion 44a or optimizing only the height h1 of the linear protrusion 44a. In addition, by optimizing at least one of the first pixel electrode slit or the first common electrode slit, the same advantage as the above-described embodiment can be obtained.

What is claimed is:

1. A liquid crystal display comprising:
   an array substrate;
   an opposite substrate, which is provided opposite to the array substrate;
   a liquid crystal, which is sealed between the array substrate and the opposite substrate;
   a plurality of pixels formed on the array substrate in a matrix and including a first sub-pixel, to which a gradation voltage for driving the liquid crystal is applied, and a second sub-pixel, which is formed separated from the first sub-pixel and to which a voltage lower than the gradation voltage is applied; and
   an alignment regulating structure for regulating the direction of alignment of the liquid crystal, which is formed so that its arrangement interval is different in the first sub-pixel and the second-sub pixel.

2. The liquid crystal display according to claim 1, wherein the arrangement interval of the alignment regulating structure for regulating the direction of alignment at the first sub-pixel (the first arrangement interval) is shorter than the arrangement interval of the alignment regulating structure for regulating the direction of alignment at the second sub-pixel (the second arrangement interval).

3. The liquid crystal display according to claim 2, wherein the first arrangement interval is shorter than the second arrangement interval by 5 μm and over.

4. The liquid crystal display according to claim 1, further comprising a switching element formed in the pixel; wherein the pixel includes a first pixel electrode, which is connected to the switching element and is formed in the first sub-pixel, a second pixel electrode, which is formed in the second sub-pixel separated from the first pixel electrode, and an inter-electrode slit, which is formed between the first and the second pixel electrodes.

5. The liquid crystal display according to claim 4, wherein the first arrangement interval is an interval between the alignment regulating structure which is disposed in the first sub-pixel adjacent to the inter-electrode and the inter-electrode slit.

6. The liquid crystal display according to claim 4, wherein the second arrangement interval is an interval between the alignment regulating structure which is disposed in the second sub-pixel adjacent to the inter-electrode and the inter-electrode slit.

7. The liquid crystal display according to claim 4, wherein the second pixel electrode is connected to the switching element by capacity coupling.

8. The liquid crystal display according to claim 4, wherein the switching element is a thin film transistor.

9. The liquid crystal display according to claim 4, wherein the alignment regulating structure for regulating the direction of alignment has at least one of a first pixel electrode slit, which is formed by removing a part of the first pixel electrode, and a second pixel electrode slit, which is formed by removing a part of the second pixel electrode.

10. The liquid crystal display according to claim 9, wherein the first pixel electrode slit is formed so as to have a different width from the width of the second pixel electrode slit.

11. The liquid crystal display according to claim 9, wherein the width of the first pixel electrode slit is narrower than the width of the second pixel electrode slit.

12. The liquid crystal display according to claim 9, wherein the first and the second pixel electrode slits are formed so as to be the width in the range of 6 μm to 12 μm.

13. The liquid crystal display according to claim 1, wherein the alignment regulating structure for regulating the direction of alignment has a bank-shaped structure.

14. The liquid crystal display according to claim 13, wherein the height of the bank-shaped structure formed in the first sub-pixel is formed so as to be lower than the height of the bank-shaped structure formed in the second sub-pixel.

15. The liquid crystal display according to claim 13, wherein the height of the bank-shaped structure is formed so as to be in the range of 0.7 μm to 1.4 μm.

16. The liquid crystal display according to claim 9, wherein the bank-shaped structure is made of a dielectric material.

17. The liquid crystal display according to claim 1, wherein the opposite substrate has a common electrode on the opposite surface to the array substrate; and
the alignment regulating structure for regulating the direction of alignment has at least one of a first common electrode slit, which is formed by removing a part of the common electrode opposite to the first pixel electrode, and a second common electrode slit, which is formed by removing a part of the common electrode opposite to the second pixel electrode.

18. The liquid crystal display according to claim 17, wherein the first common electrode slit is formed so as to be a different width from the second common electrode slit.

19. The liquid crystal display according to claim 17, wherein the width of the first common electrode slit is narrower than the width of the second common electrode slit.

20. The liquid crystal display according to claim 17, wherein the first and the second common electrode slits are formed so as to be the width in the range of 6 μto 12 μm.

21. The liquid crystal display according to claim 1, wherein the liquid crystal has a negative dielectric anisotropy and is aligned substantially perpendicular to the surface of the array substrate or the surface of the opposite substrate when no voltage is applied.

* * * * *